(12) United States Patent
Kawasaki et al.

(10) Patent No.: US 9,507,056 B2
(45) Date of Patent: *Nov. 29, 2016

(54) LAMINATED POLYESTER FILM

(75) Inventors: Taishi Kawasaki, Shiga-ken (JP); Masato Fujita, Shiga-ken (JP)

(73) Assignee: MITSUBISHI PLASTICS, INC., Tokyo (JP)

(*) Notice: Subject to any disclaimer, the term of this patent is extended or adjusted under 35 U.S.C. 154(b) by 553 days.

This patent is subject to a terminal disclaimer.

(21) Appl. No.: 13/700,842

(22) PCT Filed: May 9, 2011

(86) PCT No.: PCT/JP2011/060647
§ 371 (c)(1),
(2), (4) Date: Jan. 15, 2013

(87) PCT Pub. No.: WO2011/152173
PCT Pub. Date: Dec. 8, 2011

(65) Prior Publication Data
US 2013/0108864 A1 May 2, 2013

(30) Foreign Application Priority Data
May 29, 2010 (JP) ................................ 2010-123621

(51) Int. Cl.
| | | |
|---|---|---|
| C08L 67/02 | (2006.01) | |
| C08L 67/03 | (2006.01) | |
| C09D 167/02 | (2006.01) | |
| C09D 167/03 | (2006.01) | |
| C09J 167/02 | (2006.01) | |
| C09J 167/03 | (2006.01) | |
| C08G 63/13 | (2006.01) | |
| C08G 63/185 | (2006.01) | |
| C08G 63/187 | (2006.01) | |
| C08G 63/189 | (2006.01) | |
| C08K 3/22 | (2006.01) | |
| C08K 5/04 | (2006.01) | |
| C08K 5/1515 | (2006.01) | |
| C08K 5/1535 | (2006.01) | |
| C08K 5/29 | (2006.01) | |
| C08K 5/3415 | (2006.01) | |
| G02B 1/11 | (2015.01) | |
| G02B 1/10 | (2015.01) | |
| C08J 7/04 | (2006.01) | |
| G02B 1/111 | (2015.01) | |
| C08K 5/00 | (2006.01) | |
| C08K 3/00 | (2006.01) | |

(52) U.S. Cl.
CPC .............. G02B 1/11 (2013.01); C08J 7/047 (2013.01); G02B 1/105 (2013.01); G02B 1/111 (2013.01); C08G 63/13 (2013.01); C08G 63/185 (2013.01); C08G 63/187 (2013.01); C08G 63/189 (2013.01); C08J 7/04 (2013.01); C08J 2367/02 (2013.01); C08J 2467/02 (2013.01); C08K 3/0033 (2013.01); C08K 3/22 (2013.01); C08K 5/0025 (2013.01); C08K 5/04 (2013.01); C08K 5/1515 (2013.01); C08K 5/1535 (2013.01); C08K 5/29 (2013.01); C08K 5/3415 (2013.01); C08K 2003/2244 (2013.01); C08L 67/02 (2013.01); C08L 67/03 (2013.01); C09D 167/02 (2013.01); C09D 167/03 (2013.01); C09J 167/02 (2013.01); C09J 167/03 (2013.01); G02B 1/10 (2013.01); Y10T 428/265 (2015.01); Y10T 428/269 (2015.01); Y10T 428/31681 (2015.04); Y10T 428/31794 (2015.04)

(58) Field of Classification Search
None
See application file for complete search history.

(56) References Cited

U.S. PATENT DOCUMENTS

| | | | | |
|---|---|---|---|---|
| 5,217,832 | A * | 6/1993 | Joslin et al. | 430/7 |
| 5,958,659 | A * | 9/1999 | Takahashi | 430/533 |
| 6,054,212 | A | 4/2000 | Peiffer et al. | |
| 6,348,267 | B1 * | 2/2002 | Okajima | 428/423.7 |
| 6,391,441 | B1 * | 5/2002 | Yano | B41M 5/41 428/343 |
| 6,403,224 | B1 * | 6/2002 | Okajima et al. | 428/423.7 |
| 6,703,138 | B1 * | 3/2004 | Taki | B32B 27/36 264/288.4 |
| 6,921,580 | B2 * | 7/2005 | Akatsu | C08J 7/047 359/350 |
| 7,005,176 | B2 * | 2/2006 | Tojo et al. | 428/141 |
| 7,659,006 | B2 * | 2/2010 | Yano et al. | 428/480 |
| 8,778,500 | B2 * | 7/2014 | Kawasaki et al. | 428/423.7 |
| 8,877,343 | B2 * | 11/2014 | Kawasaki et al. | 428/483 |
| 2003/0235704 | A1 * | 12/2003 | Akatsu | C08J 7/047 428/482 |

(Continued)

FOREIGN PATENT DOCUMENTS

| | | | |
|---|---|---|---|
| JP | 2002-006345 | | 1/2002 |
| JP | 2002-053687 | * | 2/2002 |

(Continued)

OTHER PUBLICATIONS

Extended European Search Report in EP 11 78 9582 dated Sep. 10, 2014.

(Continued)

*Primary Examiner* — Vivian Chen
(74) *Attorney, Agent, or Firm* — Nixon & Vanderhye P.C.

(57) ABSTRACT

The present invention provides a laminated polyester film which can be suitably used in the applications requiring a good visibility and a good adhesion property to a hard coat layer, etc., for example, such as various kinds of optical films as members of liquid crystal displays as well as molding films. The laminated polyester film of the present invention comprises a polyester film and a coating layer formed on at least one surface of the polyester film which is produced by applying a coating solution comprising a polyester resin having a naphthalene skeleton, a metal oxide, and two or more kinds of crosslinking agents, thereonto.

8 Claims, No Drawings

(56) References Cited

U.S. PATENT DOCUMENTS

| | | | |
|---|---|---|---|
| 2004/0076844 A1* | 4/2004 | Tojo | B32B 17/10018 428/480 |
| 2004/0081839 A1* | 4/2004 | Kubo | B32B 27/36 428/482 |
| 2004/0265539 A1* | 12/2004 | Hashimoto et al. | 428/141 |
| 2006/0121299 A1* | 6/2006 | Hashimoto | C08J 5/04 428/480 |
| 2006/0227439 A1* | 10/2006 | Taki | B32B 27/08 359/883 |
| 2008/0050583 A1* | 2/2008 | Kubo | 428/339 |
| 2009/0068401 A1* | 3/2009 | Sato | C08J 5/18 428/141 |
| 2010/0239868 A1 | 9/2010 | Takada et al. | |
| 2011/0117378 A1* | 5/2011 | Kawaguchi et al. | 428/480 |
| 2011/0189489 A1* | 8/2011 | Kawasaki et al. | 428/423.7 |
| 2012/0128969 A1* | 5/2012 | Kawasaki | C08J 7/047 428/336 |
| 2013/0089730 A1* | 4/2013 | Kawasaki et al. | 428/336 |
| 2013/0108864 A1* | 5/2013 | Kawasaki et al. | 428/336 |

FOREIGN PATENT DOCUMENTS

| | | | |
|---|---|---|---|
| JP | 2002-071940 | | 3/2002 |
| JP | 2007-237720 | * | 9/2007 |
| JP | 2008-183882 | | 8/2008 |
| JP | 2008-208223 | | 9/2008 |
| JP | 2008-209681 | * | 9/2008 |
| JP | 2008-208223 | | 11/2008 |
| JP | 2009-126035 | * | 6/2009 |
| JP | 2009-143226 | * | 7/2009 |
| JP | 2008-208223 | * | 9/2009 |

OTHER PUBLICATIONS

International Search Report for PCT/JP2011/060647 mailed Jul. 26, 2011.

* cited by examiner

LAMINATED POLYESTER FILM

This application is the U.S. national phase of International Application No. PCT/JP2011/060647 filed 9 May 2011 which designated the U.S. and claims priority to JP 2010-123621 filed 29 May 2010, the entire contents of each of which are hereby incorporated by reference.

TECHNICAL FIELD

The present invention relates to a laminated polyester film, and more particularly, to a laminated polyester film which can be suitably used in the applications in which occurrence of interference fringes owing to reflection of external light should be prevented, for example, such as liquid crystal displays, plasma display panels, organic electroluminescence, etc.

BACKGROUND ART

In recent years, polyester films have been frequently used as various kinds of optical films and molding films which are employed in various applications such as touch panels, antireflection films, prism sheets, light diffusion sheets and electromagnetic shielding films as members of liquid crystal displays or plasma displays as well as in-mold transfer films and in-mold label films. A base film used for these members has been required to have excellent transparency and visibility.

These films have been often subjected to hard coating treatment in order to enhance an anti-curling property, a mar resistance and a surface hardness thereof, etc. Also, as a base material for the films, there have been generally used polyester films which are excellent in transparency and mechanical properties. In order to enhance adhesion between a polyester film and a hard coat layer, a coating layer having an easy-bonding property is generally provided as an intermediate layer therebetween. For this reason, refractive indices of these three layers including the polyester film, the easy-bonding coating layer and the hard coat layer must be taken into consideration to avoid occurrence of interference fringes.

When using the films having interference fringes in displays such as touch panels, the displays tend to exhibit a poor visibility, resulting in difficulty in handling thereof upon use. For this reason, it has been required to take a suitable measure against the interference fringes. In general, it is considered that the refractive index of the coating layer at which occurrence of interference fringes can be reduced is present near a geometrical mean value of a refractive index of the polyester film as the base material and a refractive index of the hard coat layer. Therefore, it is ideally required to adjust the refractive index of the coating layer near to the geometrical mean value. In this case, since the polyester film has a high refractive index, it has been generally required that the coating layer is designed to have a high refractive index.

As the method of enhancing a refractive index of the coating layer to prevent occurrence of interference fringes, there is known, for example, the method in which a metal chelate compound is used in combination with a resin to enhance a refractive index of the coating layer (Patent Document 1). However, in this method, owing to unstableness of the metal chelate compound in an aqueous solution, a coating solution used therein also tends to become unstable according to combination between the compound and resin, so that the procedure of replacing the coating solution with new one must be frequently repeated when continuing the film production process for a long period of time. In addition, the coating layer tends to be insufficient in wet heat resistance owing to use of the metal chelate. Therefore, it has been required to provide a coating layer which is excellent in stability of a coating solution thereof as well as wet heat resistance.

PRIOR ART DOCUMENTS

Patent Documents

Patent Document 1: Japanese Patent Application Laid-Open (KOKAI) No. 2005-97571

SUMMARY OF THE INVENTION

Problems to be Solved by the Invention

The present invention has been accomplished in view of the above conventional problems. An object of the present invention is to provide a laminated polyester film which is prevented from suffering from occurrence of interference fringes owing to reflection of external light, and exhibits an excellent adhesion property to various surface functional layers such as a hard coat.

Means for Solving Problems

As a result of the present inventors' earnest study in view of the above problems, it has been found that these problems can be readily solved by using a laminated polyester film having a specific structure. The present invention has been attained on the basis of this finding.

That is, in an aspect of the present invention, there is provided a laminated polyester film comprising:
  a polyester film and
  a coating layer which is formed on at least one surface of the polyester film and is produced by applying a coating solution comprising a polyester resin having a naphthalene skeleton, a metal oxide, and two or more kinds of crosslinking agents, thereonto.

Effect of the Invention

In accordance with the present invention, there can be provided a laminated polyester film which can be prevented from suffering from occurrence of interference fringes owing to reflection of external light and is excellent in adhesion to various surface functional layers such as a hard coat layer when the surface functional layers are laminated thereon. Therefore, the present invention has a high industrial value.

PREFERRED EMBODIMENTS FOR CARRYING OUT THE INVENTION

The polyester film constituting the laminated polyester film of the present invention may have either a single layer structure or a multilayer structure. Unless departing from the scope of the present invention, the polyester film may have not only a two or three layer structure but also a four or more multilayer structure, and the layer structure of the polyester film is not particularly limited thereto.

The polyester used in the present invention may be in the form of either a homopolyester or a copolyester. The homopolyester is preferably obtained by polycondensing an aromatic dicarboxylic acid and an aliphatic glycol. Examples of the aromatic dicarboxylic acid include terephthalic acid and 2,6-naphthalenedicarboxylic acid. Examples of the aliphatic glycol include ethylene glycol, diethylene glycol and 1,4-cyclohexanedimethanol. Typical examples of the polyesters include polyethylene terephthalate or the like. On the other hand, as a dicarboxylic acid component of the copolyester, there may be mentioned at least one compound selected from the group consisting of isophthalic acid, phthalic acid, terephthalic acid, 2,6-naphthalenedicarboxylic acid, adipic acid, sebacic acid and oxycarboxylic acids (such as, for example, p-oxybenzoic acid). As a glycol component of the copolyester, there may be mentioned at least one compound selected from the group consisting of ethylene glycol, diethylene glycol, propylene glycol, butanediol, 4-cyclohexanedimethanol and neopentyl glycol.

In addition, the polyester film used in the present invention may also comprise an ultraviolet absorber in order to improve a weather resistance of the film and prevent deterioration of a pigment used in the applications such as a color filter. The ultraviolet absorber is not particularly limited as long as it is a compound having a capability of absorbing an ultraviolet ray and can withstand heat generated during a process for producing the polyester film.

As the ultraviolet absorber, there are generally known an organic ultraviolet absorber and an inorganic ultraviolet absorber. In view of a good transparency of the polyester film, among these ultraviolet absorbers, the organic ultraviolet absorber is preferably used. Examples of the organic ultraviolet absorber include, but are not particularly limited to, cyclic iminoester-based ultraviolet absorbers, benzotriazole-based ultraviolet absorbers and benzophenone-based ultraviolet absorbers. Among these organic ultraviolet absorbers, cyclic iminoester-based ultraviolet absorbers and benzotriazole-based ultraviolet absorbers are preferred in view of a good durability. These ultraviolet absorbers may be used in combination of any two or more thereof.

Mainly for the purpose of imparting an easy-slipping property to the film and preventing occurrence of flaws in the film during the respective steps, particles may be compounded in the polyester layer in the film of the present invention. The kinds of particles to be compounded in the polyester layer are not particularly limited as long as the particles are capable of imparting a good easy-slipping property to the film. Specific examples of the particles include particles of silica, calcium carbonate, magnesium carbonate, barium carbonate, calcium sulfate, calcium phosphate, magnesium phosphate, kaolin, aluminum oxide, titanium oxide, organic particles, etc. Further, there may also be used deposited particles obtained by precipitating and finely dispersing a part of metal compounds such as a catalyst during the process for production of the polyester.

The laminated polyester film according to the present invention preferably has a high transparency and a high clarity when used in applications such as various optical films and decorative films. In order to enhance a transparency and a clarity of the film, the content of the particles in the polyester film is preferably small. Therefore, the laminated polyester film according to the present invention is preferably designed to have a multilayer structure in which particles are contained in a surface layer thereof only, or preferably designed such that no particles are contained in the polyester film. In the case where the polyester film is designed to comprise no particles, which is more preferred from the viewpoint of attaining a good transparency and a good clarity, in order to improve a handling property of the film such as an easy-slipping property thereof, the coating layer is preferably designed to comprise the particles.

Meanwhile, the polyester film used in the present invention may also comprise known additives such as an antioxidant, an antistatic agent, a thermal stabilizer, a lubricant, a dye, a pigment, etc., if required.

The thickness of the polyester film used in the present invention is not particularly limited as long as it lies within any suitable range capable of forming a film shape, and is usually in the range of 10 to 300 μm and preferably 25 to 250 μm.

Next, an example of the process of producing the polyester film used in the present invention is more specifically explained, although not particularly limited thereto. That is, in the production process, there is preferably used such a method in which the above-mentioned raw polyester material is extruded from a die in the form of a molten sheet, and the molten sheet is cooled and solidified on a cooling roll to obtain an unstretched sheet. In this case, in order to enhance a flatness of the sheet, it is preferred to enhance adhesion between the sheet and the rotary cooling drum. For this purpose, an electrostatic adhesion method and/or a liquid coating adhesion method are preferably used. Next, the thus obtained unstretched sheet is biaxially stretched. In such a case, the unstretched sheet is first stretched in one direction thereof using a roll-type or tenter-type stretching machine. The stretching temperature is usually 70 to 120° C. and preferably 80 to 110° C., and the stretch ratio is usually 2.5 to 7 times and preferably 3.0 to 6 times. Next, the thus stretched film is stretched in the direction perpendicular to the stretching direction of the first stage. In this case, the stretching temperature is usually 70 to 170° C., and the stretch ratio is usually 3.0 to 7 times and preferably 3.5 to 6 times. Successively, the resulting biaxially stretched sheet is heat-treated at a temperature of 180 to 270° C. under a tension or under relaxation within 30% to obtain a biaxially oriented film. Upon the above stretching steps, there may also be used the method in which the stretching in each direction is carried out in two or more stages. In such a case, the multi-stage stretching is preferably performed such that the stretch ratio in each of the two directions is finally fallen within the above-specified range.

Also, the polyester film constituting the laminated polyester film according to the present invention may also be produced by a simultaneous biaxial stretching method. The simultaneous biaxial stretching method is such a method in which the above unstretched sheet is stretched and oriented in both of the machine and width directions at the same time while maintaining the sheet in a suitable temperature-controlled condition at a temperature of usually 70 to 120° C. and preferably 80 to 110° C. The stretch ratio used in the simultaneous biaxial stretching method is 4 to 50 times, preferably 7 to 35 times and more preferably 10 to 25 times in terms of an area ratio of the film. Successively, the obtained biaxially stretched sheet is heat-treated at a temperature of 170 to 250° C. under a tension or under relaxation within 30% to obtain a stretched oriented film. As the apparatus used in the above simultaneous biaxial stretching method, there may be employed those stretching apparatuses of any conventionally known type such as a screw type stretching apparatus, a pantograph type stretching apparatus and a linear drive type stretching apparatus.

Next, the method for forming the coating layer constituting the laminated polyester film according to the present invention is explained. The coating layer may be formed by either an in-line coating method in which the surface of the polyester film is subjected to coating treatment during the stretching step of the polyester film, an off-line coating method in which the polyester film produced is once transferred to an outside of the film production system and subjected to coating treatment, or combination of these methods. Among these methods, the in-line coating method is preferably used because the coating layer can be formed simultaneously with production of the polyester film and therefore the film can be produced at low costs, and the thickness of the coating layer can be varied by adjusting a stretch ratio of the polyester film.

For example, in the case of a sequential biaxial stretching, the in-line coating treatment may be carried out, in particular, after completion of the longitudinal stretching but before initiation of the lateral stretching, although not particularly limited thereto. When the coating layer is formed on the polyester film by the in-line coating method, the coating can be carried out simultaneously with formation of the polyester film, and the coating layer can be treated at an elevated temperature. As a result, it is possible to produce a film suitably used as the polyester film in the present invention.

According to the present invention, it is essentially required that the laminated polyester film comprises a polyester film and a coating layer formed on at least one surface of the polyester film which is produced by applying a coating solution comprising a polyester resin having a naphthalene skeleton, a metal oxide, and two or more kinds of crosslinking agents, thereonto.

In the present invention, the polyester resin having a naphthalene skeleton is used mainly for the purpose of controlling a refractive index of the coating layer and improving an adhesion property of the coating layer to a surface functional layer such as a hard coat layer.

As the method of incorporating a naphthalene skeleton into the polyester resin, there may be used, for example, the method of introducing two or more hydroxyl groups as substituent groups into a naphthalene ring to provide a diol component or a polyhydroxyl group component, or the method of introducing two or more carboxyl groups as substituent groups into a naphthalene ring to provide a dicarboxylic acid component or a polycarboxylic acid component. Among these methods, from the standpoint of a good stability of the polyester resin, preferred is the method of introducing a carboxyl group into a naphthalene ring to provide an acid component. Typical examples of the naphthalene skeleton having carboxyl groups introduced thereinto include 2,6-naphthalenedicarboxylic acid, 1,5-naphthalenedicarboxylic acid and 2,7-naphthalenedicarboxylic acid, etc. Among these compounds, preferred is 2,6-naphthalenedicarboxylic acid.

In addition, as constituents of the polyester resin having a naphthalene skeleton, compounds having no naphthalene skeleton such as, for example, the following polycarboxylic acids and polyhydroxy compounds may also be used in combination with the above components. More specifically, as the polycarboxylic acids, there may be used terephthalic acid, isophthalic acid, orthophthalic acid, phthalic acid, 4,4'-diphenyldicarboxylic acid, 1,4-cyclohexanedicarboxylic acid, 2-potassium sulfo-terephthalic acid, 5-sodium sulfo-isophthalic acid, adipic acid, azelaic acid, sebacic acid, dodecanedicarboxylic acid, glutaric acid, succinic acid, trimellitic acid, trimesic acid, pyromellitic acid, trimellitic anhydride, phthalic anhydride, p-hydroxybenzoic acid, trimellitic acid monopotassium salt and ester-forming derivatives thereof. Examples of the polyhydroxy compounds include ethylene glycol, 1,2-propylene glycol, 1,3-propylene glycol, 1,3-propanediol, 1,4-butanediol, 1,6-hexanediol, 2-methyl-1,5-pentanediol, neopentyl glycol, 1,4-cyclohexane dimethanol, p-xylylene glycol, an adduct of bisphenol A with ethylene glycol, diethylene glycol, triethylene glycol, polyethylene glycol, polypropylene glycol, polytetramethylene glycol, polytetramethylene oxide glycol, dimethylol propionic acid, glycerin, trimethylol propane, sodium dimethylol ethyl sulfonate and potassium dimethylol propionate.

In the present invention, the metal oxide is used mainly for the purpose of controlling a refractive index of the coating layer. In particular, since the resin used in the coating layer has a low refractive index, the use of the metal oxide having a high refractive index is preferred, and the use of the metal oxide having a refractive index of not less than 1.7 is more preferred. Specific examples of the metal oxide include zirconium oxide, titanium oxide, tin oxide, yttrium oxide, antimony oxide, indium oxide, zinc oxide, antimony tin oxide and indium tin oxide. These metal oxides may be used alone or in combination of any two or more thereof. Among these metal oxides, preferred are zirconium oxide and titanium oxide. In particular, zirconium oxide is more preferred from the standpoint of imparting a good weather resistance to the coating layer.

The metal oxide tends to have a fear of causing deterioration in adhesion property of the coating layer and stability of the coating solution depending upon its configuration upon use. Therefore, the metal oxide is preferably used in the form of particles. In addition, from the standpoint of a good transparency of the coating layer and a good stability of the coating solution, the average particle diameter of the metal oxide is preferably in the range of 0.001 to 0.1 μm. Among them, the metal oxides having a small particle diameter are more preferred because they are capable of more readily controlling a refractive index of the coating layer while maintaining a transparency of the coating layer. However, as described hereinlater, in the case where the particles are also used for the purpose of imparting a good handling property such as an easy-slipping property to the resulting film, the metal oxide particles having an average particle diameter of 0.1 to 1.0 μm may be used in a small amount unless a transparency of the resulting film is adversely affected.

In the present invention, the two or more kinds of crosslinking agents are used in the coating solution for the purpose of enhancing an adhesion property of the coating layer to a surface functional layer after forming the surface functional layer thereon and a wet heat resistance of the coating layer. It has been found that even by incorporating only one kind of crosslinking agent in the coating layer, it was possible to enhance an adhesion property and a wet heat resistance of the coating layer by selecting the suitable kind of crosslinking agent. In order to further enhance these properties, various studies have been made. As a result, it has been found that by using combination of two or more kinds of crosslinking agents, the resulting coating layer exhibits excellent adhesion property and wet heat resistance which have not been conventionally achieved only by using one kind of crosslinking agent.

As the crosslinking agent to be incorporated in the coating solution, there may be used various known crosslinking agents. Examples of the crosslinking agent include an isocyanate compound, an oxazoline compound, a melamine compound, an epoxy compound and a carbodiimide compound as well as reaction products thereof.

Examples of the isocyanate compound include aromatic isocyanates such as tolylene diisocyanate, xylylene diisocyanate, methylene diphenyl diisocyanate, phenylene diisocyanate and naphthalene diisocyanate; aromatic ring-containing aliphatic isocyanates such as α,α,α',α'-tetramethyl xylylene diisocyanate; aliphatic isocyanates such as methylene diisocyanate, propylene diisocyanate, lysine diisocyanate, trimethyl hexamethylene diisocyanate and hexamethylene diisocyanate; and alicyclic isocyanates such as cyclohexane diisocyanate, methyl cyclohexane diisocyanate, isophorone diisocyanate, methylene-bis(4-cyclohexyl isocyanate) and isopropylidene dicyclohexyl diisocyanate. Among these isocyanate compounds, in particular, from the viewpoint of a good adhesion property of the coating layer, preferred are tolylene diisocyanate and hexamethylene diisocyanate. Further examples of the isocyanate compound include polymers and derivatives of these isocyanates such as biuret compounds, isocyanurate compounds, uretdione compounds and carbodiimide-modified compounds thereof. These isocyanate compounds may be used alone or in combination of any two or more thereof.

When the isocyanate compound is used in the form of a blocked isocyanate, examples of blocking agents used for production thereof include bisulfites; phenol-based compounds such as phenol, cresol and ethyl phenol; alcohol-based compounds such as propylene glycol monomethyl ether, ethylene glycol, benzyl alcohol, methanol and ethanol; active methylene-based compounds such as dimethyl malonate, diethyl malonate, methyl acetoacetate, ethyl acetoacetate and acetyl acetone; mercaptan-based compounds such as butyl mercaptan and dodecyl mercaptan; lactam-based compounds such as ε-caprolactam and δ-valerolactam; amine-based compounds such as diphenyl aniline, aniline and ethylene imine; acid amide-based compounds such as acetanilide and acetic acid amide; and oxime-based compounds such as formaldehyde, acetaldoxime, acetone oxime, methyl ethyl ketone oxime and cyclohexanone oxime. These blocking agents may be used alone or in combination of any two or more thereof.

In addition, the above isocyanate compounds may be used in the form of a single substance or in the form of a mixture with various polymers or a bonded product therewith.

The oxazoline compound is a compound having an oxazoline group in a molecule thereof. An especially preferred oxazoline compound is a polymer having an oxazoline group which may be produced by homopolymerizing an addition-polymerizable oxazoline group-containing monomer or by copolymerizing the addition-polymerizable oxazoline group-containing monomer with the other monomer. Examples of the addition-polymerizable oxazoline group-containing monomer include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline and 2-isopropenyl-5-ethyl-2-oxazoline. These oxazoline compounds may be used alone or in the form of a mixture of any two or more thereof. Among these oxazoline compounds, 2-isopropenyl-2-oxazoline is more preferred because of good industrial availability thereof. The other monomers used in the copolymer are not particularly limited as long as they are monomers which are copolymerizable with the addition-polymerizable oxazoline group-containing monomer. Examples of the other monomers include (meth)acrylic acid esters such as alkyl (meth)acrylates (in which the alkyl group may be methyl, ethyl, n-propyl, isopropyl, n-butyl, isobutyl, t-butyl, 2-ethylhexyl, cyclohexyl or the like); unsaturated carboxylic acids such as acrylic acid, methacrylic acid, itaconic acid, maleic acid, fumaric acid, crotonic acid, styrenesulfonic acid and salts thereof (such as sodium salts, potassium salts, ammonium salts and tertiary amine salts); unsaturated nitriles such as acrylonitrile and methacrylonitrile; unsaturated amides such as (meth)acrylamide, N-alkyl (meth)acrylamides and N,N-dialkyl (meth)acrylamides (in which the alkyl group may be methyl, ethyl, n-propyl, isopropyl, n-butyl, isobutyl, t-butyl, 2-ethylhexyl, cyclohexyl or the like); vinyl esters such as vinyl acetate and vinyl propionate; vinyl ethers such as methyl vinyl ether and ethyl vinyl ether; α-olefins such as ethylene and propylene; halogen-containing α,β-unsaturated monomers such as vinyl chloride, vinylidene chloride and vinyl fluoride; and α,β-unsaturated aromatic monomers such as styrene and α-methyl styrene. These other monomers may be used alone or in combination of any two or more thereof.

The melamine compound is a compound having a melamine skeleton therein. Examples of the melamine compound include alkylolated melamine derivatives, partially or completely etherified compounds obtained by reacting the alkylolated melamine derivative with an alcohol, and a mixture of these compounds. Examples of the alcohol suitably used for the above etherification include methyl alcohol, ethyl alcohol, isopropyl alcohol, n-butanol and isobutanol. The melamine compound may be either a monomer or a dimer or higher polymer, or may be in the form of a mixture thereof. In addition, there may also be used those compounds obtained by subjecting a urea or the like to co-condensation with a part of melamine. Further, a catalyst may also be used to enhance a reactivity of the melamine compound.

Examples of the epoxy compound include condensation products of epichlorohydrin with a hydroxyl group of ethylene glycol, polyethylene glycol, glycerol, polyglycerol, bisphenol A, etc., or an amino group. Specific examples of the epoxy compound include polyepoxy compounds, diepoxy compounds, monoepoxy compounds and glycidyl amine compounds. Examples of the polyepoxy compounds include sorbitol polyglycidyl ether, polyglycerol polyglycidyl ether, pentaerythritol polyglycidyl ether, diglycerol polyglycidyl ether, triglycidyl tris(2-hydroxyethyl)isocyanate, glycerol polyglycidyl ether and trimethylolpropane polyglycidyl ether. Examples of the diepoxy compounds include neopentyl glycol diglycidyl ether, 1,6-hexanediol diglycidyl ether, resorcin diglycidyl ether, ethylene glycol diglycidyl ether, polyethylene glycol diglycidyl ether, propylene glycol diglycidyl ether, polypropylene glycol diglycidyl ether and polytetramethylene glycol diglycidyl ether. Examples of the monoepoxy compounds include allyl glycidyl ether, 2-ethylhexyl glycidyl ether and phenyl glycidyl ether. Examples of the glycidyl amine compounds include N,N,N',N'-tetraglycidyl-m-xylylenediamine and 1,3-bis(N,N-diglycidylamino)cyclohexane.

Among these crosslinking agents, from the viewpoint of enhancing an adhesion property and a wet heat resistance of the coating layer, the isocyanate compound and the oxazoline compound are preferably used. Further, in view of the application to in-line coating, the crosslinking agents preferably have a water solubility or a water dispersibility.

In the laminated polyester film according to the present invention, for the purpose of improving surface properties of the coating layer, reducing occurrence of interference fringes when laminating various surface functional layers such as a hard coat layer on the coating layer, and enhancing a transparency or an adhesion property of the resulting film, etc., various polymers may also be used in combination with the above components.

Specific examples of the polymers include polyester resins having no naphthalene skeleton, acrylic resins, urethane resins, polyalkylene glycols, polyalkylene imines, methyl cellulose, hydroxycellulose, starches, etc. Among these polymers, from the standpoint of enhancing an adhesion property of the coating layer to the surface functional layer such as a hard coat layer, etc., the polyester resins having no naphthalene skeleton, acrylic resins and urethane resins are preferably used.

Examples of the polyester resins having no naphthalene skeleton include those polyester resins produced from a polycarboxylic acid and a polyhydroxy compound as described above.

The acrylic resin is in the form of a polymer obtained from a polymerizable monomer having a carbon-to-carbon double bond such as, typically, an acrylic monomer and a methacrylic monomer. The polymer may be either a homopolymer or a copolymer. The polymer may also include a copolymer of the polymer with the other polymer (such as, for example, a polyester and a polyurethane). Examples of the copolymer include a block copolymer and a graft copolymer. In addition, the polymer may also include a polymer obtained by polymerizing the polymerizable monomer having a carbon-to-carbon double bond in a polyester solution or a polyester dispersion (which may also be in the form of a mixture of the polymers). Further, the polymer may also include a polymer obtained by polymerizing the polymerizable monomer having a carbon-to-carbon double bond in a polyurethane solution or a polyurethane dispersion (which may also be in the form of a mixture of the polymers). Similarly, the polymer may also include a polymer obtained by polymerizing the polymerizable monomer having a carbon-to-carbon double bond in the other polymer solution or the other polymer dispersion (which may also be in the form of a mixture of the polymers). In addition, in the case where it is required to further enhance an adhesion property of the coating layer, a functional group such as a hydroxyl group and an amino group may be incorporated thereinto.

The above polymerizable monomer having a carbon-to-carbon double bond is not particularly limited. Examples of the typical compounds as the polymerizable monomer include various carboxyl group-containing monomers such as acrylic acid, methacrylic acid, crotonic acid, itaconic acid, fumaric acid, maleic acid and citraconic acid, and salts thereof; various hydroxyl group-containing monomers such as 2-hydroxyethyl (meth)acrylate, 2-hydroxypropyl (meth)acrylate, 4-hydroxybutyl (meth)acrylate, monobutylhydroxyl fumarate and monobutylhydroxyl itaconate; various (meth)acrylic acid esters such as methyl (meth)acrylate, ethyl (meth)acrylate, propyl (meth)acrylate, butyl (meth)acrylate and lauryl (meth)acrylate; various nitrogen-containing compounds such as (meth)acrylamide, diacetone acrylamide, N-methylol acrylamide and (meth)acrylonitrile; various styrene derivatives such as styrene, α-methyl styrene, divinyl benzene and vinyl toluene; various vinyl esters such as vinyl propionate; various silicon-containing polymerizable monomers such as γ-methacryloxypropyltrimethoxysilane and vinyl trimethoxysilane; various phosphorus-containing vinyl-based monomers; various halogenated vinyl-based monomers such as vinyl chloride and vinylidene chloride; and various conjugated dienes such as butadiene.

The urethane resin is a high-molecular compound having a urethane bond in a molecule thereof. The urethane resin is usually produced by the reaction between a polyol and an isocyanate. Examples of the polyol include polycarbonate polyols, polyester polyols, polyether polyols, polyolefin polyols and acrylic polyols. These compounds may be used alone or in combination of any two or more thereof.

The polycarbonate polyols may be obtained by subjecting a polyhydric alcohol and a carbonate compound to dealcoholization reaction. Examples of the polyhydric alcohol include ethylene glycol, 1,2-propylene glycol, 1,3-propylene glycol, 1,2-butanediol, 1,3-butanediol, 1,4-butanediol, 1,5-pentanediol, 1,6-hexanediol, 1,4-cyclohexanediol, 1,4-cyclohexane dimethanol, 1,7-heptanediol, 1,8-octanediol, 1,9-nonanediol, 1,10-decanediol, neopentyl glycol, 3-methyl-1,5-pentanediol and 3,3-dimethylol heptane. Examples of the carbonate compound include dimethyl carbonate, diethyl carbonate, diphenyl carbonate and ethylene carbonate. Examples of the polycarbonate polyols obtained by the reaction between the above compounds include poly(1,6-hexylene)carbonate and poly(3-methyl-1,5-pentylene)carbonate.

Examples of the polyester polyols include those compounds produced by reacting a polycarboxylic acid (such as malonic acid, succinic acid, glutaric acid, adipic acid, pimelic acid, suberic acid, sebacic acid, fumaric acid, maleic acid, terephthalic acid and isophthalic acid) or an acid anhydride thereof with a polyhydric alcohol (such as ethylene glycol, diethylene glycol, triethylene glycol, propylene glycol, dipropylene glycol, tripropylene glycol, butanediol, 1,3-butanediol, 1,4-butanediol, 2,3-butanediol, 2-methyl-1,3-propanediol, 1,5-pentanediol, neopentyl glycol, 1,6-hexanediol, 3-methyl-1,5-pentanediol, 2-methyl-2,4-pentanediol, 2-methyl-2-propyl-1,3-propanediol, 1,8-octanediol, 2,2,4-trimethyl-1,3-pentanediol, 2-ethyl-1,3-hexanediol, 2,5-dimethyl-2,5-hexanediol, 1,9-nonanediol, 2-methyl-1,8-octanediol, 2-butyl-2-ethyl-1,3-propanediol, 2-butyl-2-hexyl-1,3-propanediol, cyclohexanediol, bishydroxymethylcyclohexane, dimethanol benzene, bishydroxyethoxybenzene, alkyl dialkanol amines and lactonediol).

Examples of the polyether polyols include polyethylene glycol, polypropylene glycol, polyethylene/propylene glycol, polytetramethylene ether glycol and polyhexamethylene ether glycol.

Examples of a polyisocyanate compound used for producing the urethane resin include aromatic diisocyanates such as tolylene diisocyanate, xylylene diisocyanate, methylene diphenyl diisocyanate, phenylene diisocyanate, naphthalene diisocyanate and tolidine diisocyanate; aromatic ring-containing aliphatic diisocyanates such as α,α,α',α'-tetramethyl xylylene diisocyanate; aliphatic diisocyanates such as methylene diisocyanate, propylene diisocyanate, lysine diisocyanate, trimethyl hexamethylene diisocyanate and hexamethylene diisocyanate; and alicyclic diisocyanates such as cyclohexane diisocyanate, methyl cyclohexane diisocyanate, isophorone diisocyanate, dicyclohexylmethane diisocyanate and isopropylidene dicyclohexyl diisocyanate. These polyisocyanate compounds may be used alone or in combination of any two or more thereof.

When the urethane resin is synthesized, there may be used a chain extender. The chain extender is not particularly limited, and any chain extender may be used as long as it has two or more active groups capable of reacting with an isocyanate group. In general, there may be mainly used such a chain extender having two hydroxyl groups or two amino groups.

Examples of the chain extender having two hydroxyl groups include glycols, e.g., aliphatic glycols such as ethylene glycol, propylene glycol and butanediol; aromatic glycols such as xylylene glycol and bishydroxyethoxybenzene; and ester glycols such as neopentyl glycol hydroxypivalate. Examples of the chain extender having two amino groups include aromatic diamines such as tolylenediamine, xylylenediamine and diphenylmethanediamine; aliphatic diamines such as ethylenediamine, propylenediamine, hexanediamine, 2,2-dimethyl-1,3-propanediamine, 2-methyl-1,5-pentanediamine, trimethyl hexanediamine, 2-butyl-2-ethyl-1,5-pentanediamine, 1,8-octanediamine, 1,9-nonanediamine and 1,10-decanediamine; and alicyclic diamines such as 1-amino-3-aminomethyl-3,5,5-trimethyl cyclohexane, dicyclohexylmethanediamine, isopropylidene cyclohexyl-4,4'-diamine, 1,4-diaminocyclohexane and 1,3-bisaminomethyl cyclohexane.

The urethane resin may be dispersed or dissolved in a solvent as a medium, and is preferably dispersed or dissolved in water as the medium. In order to disperse or dissolve the urethane resin in water, there may be used those urethane resins of a forcibly emulsifiable type which can be dispersed and dissolved using an emulsifier, or those urethane resins of a self-emulsifiable type or a water-soluble type which are obtained by introducing a hydrophilic group into urethane resins, etc. Among these urethane resins, in particular, self-emulsifiable type urethane resins which are ionomerized by introducing an ionic group into a skeleton of urethane resins are preferred because they are excellent in storage stability of the coating solution as well as water resistance, transparency and adhesion property of the resulting coating layer. Examples of the ionic group to be introduced into the urethane resins include various groups such as a carboxyl group, a sulfonic acid group, a phosphoric acid group, a phosphonic acid group and a quaternary ammonium salt group. Among these ionic groups, preferred is a carboxyl group. As the method of introducing a carboxyl group into the urethane resin, there may be used various methods which may be carried out in respective stages of the polymerization reaction. For example, there may be used the method in which a carboxyl group-containing resin is used as a comonomer component upon synthesis of a prepolymer, or the method in which a carboxyl group-containing component is used as one component of the polyol, the polyisocyanate, the chain extender and the like. In particular, there is preferably used the method in which a carboxyl group-containing diol is used to introduce a desired amount of a carboxyl group into the urethane resins by suitably adjusting an amount of the diol component charged. For example, the diol used in the polymerization for production of the urethane resin may be copolymerized with dimethylol propionic acid, dimethylol butanoic acid, bis-(2-hydroxyethyl)propionic acid, bis-(2-hydroxyethyl)butanoic acid, etc. In addition, the carboxyl group thus introduced is preferably formed into a salt thereof by neutralizing the carboxyl group with ammonia, amines, alkali metals, inorganic alkalis, etc. Among these compounds used for the neutralization, especially preferred are ammonia, trimethylamine and triethylamine. When using such a polyurethane resin, the carboxyl group thereof from which the neutralizing agent is removed in the drying step after the coating step may be used as a crosslinking reaction site which can be reacted with other crosslinking agents. As a result, the coating solution using the above-described urethane resin is excellent in stability even when preserved in the form of a solution before subjected to coating treatment, and further the coating layer obtained therefrom can be further improved in durability, solvent resistance, water resistance, anti-blocking property, etc.

In addition, in the present invention, for the purpose of improving a fixing property and a slip property of the coating layer, the coating layer also preferably comprises particles other than the above metal oxide. In particular, when the polyester film is designed to comprise no particles therein, in order to improve a handling property of the film such as an easy-slipping property, the coating layer is preferably designed to comprise particles having a larger particle diameter than that of the above metal oxide particles. The average particle diameter of the particles used in the coating layer for the above purpose is preferably in the range of not more than 1.0 µm, more preferably 0.05 to 0.7 µm and especially preferably 0.1 to 0.5 µm from the standpoint of a good transparency of the resulting film. Specific examples of the particles used in the coating layer include particles of silica, alumina, kaolin and calcium carbonate, and organic particles. Among these particles, silica particles are especially preferred from the viewpoint of a good dispersibility thereof.

In addition, known anionic surfactants or nonionic surfactants may be further added in an appropriate amount in order to enhance a wettability to the film and uniformly apply the coating solution thereto, unless the subject matter of the present invention is adversely affected. Among these surfactants, in order to further enhance a wettability to the film, fluorine-based surfactants are more suitably used.

The fluorine-based surfactants as used herein mean compounds having a hydrocarbon chain whose hydrogen atoms are partially or wholly substituted with a fluorine atom. In addition, when using an aqueous coating solution, the fluorine-based surfactants preferably have a water solubility or a water dispersibility to some extent. Examples of the fluorine-based surfactants include compounds having a hydrophilic group in addition to the fluorine-substituted hydrocarbon chain. Examples of the hydrophilic group include amine salts or metal salts of sulfonic acid, carboxylic acids and phosphoric acid, halides of tertiary amines, a hydroxyl group and an ether group.

Examples of the anionic fluorine-based surfactants include lithium salts, potassium salts, sodium salts and ammonium salts of perfluoroalkyl ($C_4$ to $C_{12}$) sulfonic acids; potassium salts, sodium salts and ammonium salts of perfluoroalkyl ($C_7$ to $C_{20}$) carboxylic acids; potassium salts of perfluoroalkyl dicarboxylic acids; and salts of perfluoroalkyl phosphoric acids. Examples of the nonionic fluorine-based surfactants include perfluorooctane-sulfonic acid diethanol amide, N-propyl-N-(2-hydroxyethyl) perfluorooctane-sulfonic acid amide, perfluoroalkyl polyoxyethylene ethanols and perfluoroalkyl alkoxylates.

Further, the coating layer may also comprise various additives such as a defoaming agent, a thickening agent, an organic lubricant, an antistatic agent, an ultraviolet absorber, an antioxidant, a foaming agent, a dye and a pigment, if required, unless the subject matter of the present invention is adversely affected thereby.

The content of a naphthalene ring in the polyester resin having a naphthalene skeleton is preferably in the range of 5 to 80% by weight and more preferably 10 to 60% by weight. Also, the content of the polyester resin having a naphthalene skeleton in the coating solution is usually in the range of 5 to 90% by weight, preferably 10 to 85% by weight and more preferably 15 to 80% by weight based on a whole amount of non-volatile components in the coating solution. When using the polyester resin having a naphthalene skeleton within the above-specified range, the coating layer can be readily controlled in refractive index thereof, and occurrence of interference fringes on the coating layer after forming a surface functional layer such as a hard coat layer thereon can be readily reduced. Meanwhile, the naphthalene ring content may be determined, for example, by dissolving and extracting the coating layer in an appropriate solvent or warm water, fractionating the naphthalene component by chromatography, and subjecting the obtained component to structural analysis by NMR or IR and further to pyrolysis GC-MS (gas chromatography mass spectrometry) or optical analysis, etc.

The content of the metal oxide in the coating solution is usually in the range of 3 to 70% by weight, preferably 5 to 50% by weight, more preferably 5 to 40% by weight and especially preferably 6 to 30% by weight based on a whole amount of non-volatile components in the coating solution. When the content of the metal oxide in the coating solution is less than 3% by weight, the refractive index of the coating layer tends to be hardly increased to a sufficient extent, so that it may be difficult to prevent occurrence of interference fringes. When the content of the metal oxide in the coating solution is more than 70% by weight, the obtained coating layer tends to be deteriorated in transparency as well as adhesion property.

The content of the crosslinking agents in the coating solution is usually in the range of 1 to 50% by weight, preferably 5 to 40% by weight and more preferably 8 to 30% by weight based on a whole amount of non-volatile components in the coating solution. When the content of the crosslinking agents in the coating solution is less than 1% by weight, the resulting coating layer tends to become brittle, and therefore the resulting film tends to be deteriorated in wet heat resistance. When the content of the crosslinking agents in the coating solution is more than 50% by weight, the resulting coating layer tends to become excessively hard and therefore tends to be deteriorated in adhesion property.

In the present invention, the content of the particles used for improving a handling property of the film such as an easy-slipping property which may be incorporated in the coating layer is preferably in the range of 0.1 to 5% by weight, more preferably 0.3 to 3% by weight and still more preferably 0.4 to 2% by weight based on a whole amount of non-volatile components in the coating solution. When the content of the particles in the coating layer is excessively small, it is required to enhance the effect of the metal oxide particles incorporated in the coating layer, or improve a handling property of the film by incorporating the particles thereinto. When the content of the particles in the coating layer is excessively large, the resulting film tends to be deteriorated in transparency.

The polyester film used in the present invention may also be provided, on its surface opposed to the surface on which the above coating layer is formed, with a further coating layer. For example, when it is intended to provide a functional layer such as a micro lens layer, a prism layer, an anti-sticking layer, a light diffusion layer, a hard coat layer, an adhesive layer and a printing layer on a surface of the polyester film which is opposed to the surface on which the above surface functional layer such as a hard coat layer is formed, the provision of such a further coating layer on the opposite surface of the polyester film is capable of enhancing adhesion to these functional layers. As the components of the further coating layer formed on the opposite surface of the polyester film, there may be used conventionally known materials. Examples of the materials for the further coating layer include binder polymers such as polyester resins, acrylic resins and urethane resins, crosslinking agents such as oxazoline-based compounds, epoxy-based compounds, melamine-based compounds and isocyanate-based compounds, and the like. These materials may be respectively used alone or in combination of any two or more thereof. In addition, the further coating layer may be a coating layer which comprises the polyester resin having a naphthalene skeleton, the metal oxide, and the two or more kinds of crosslinking agents as described above (i.e., the same coating layer may be formed on opposite surfaces of the polyester film).

The analysis of the respective components included in the coating layer may be conducted, for example, by analysis methods such as TOF-SIMS, ESCA and fluorescent X-ray analysis.

When forming the coating layer by an in-line coating method, the laminated polyester film is preferably produced by the method in which an aqueous solution or a water dispersion comprising a series of the above-mentioned compounds is prepared as a coating solution having a concentration of about 0.1 to about 50% by weight in terms of a solid content thereof, and the thus prepared coating solution is applied onto the polyester film. The coating solution may also comprise a small amount of an organic solvent for the purpose of improving a dispersibility in water, a film-forming property, etc., unless the subject matter of the present invention is adversely affected thereby. The organic solvent may be used alone, or two or more organic solvents may be appropriately used in the form of a mixture thereof.

In the laminated polyester film according to the present invention, the thickness of the coating layer formed on the polyester film is usually in the range of 0.04 to 0.20 μm and preferably 0.07 to 0.15 μm. When the thickness of the coating layer is out of the above-specified range, the resulting film tends to be deteriorated in visibility owing to occurrence of interference fringes which tends to be caused after laminating a surface functional layer on the coating layer.

In the present invention, as the method of forming the coating layer, there may be used conventionally known coating methods such as a reverse gravure coating method, a direct gravure coating method, a roll coating method, a die coating method, a bar coating method and a curtain coating method.

In the present invention, the drying and curing conditions used upon forming the coating layer on the polyester film are not particularly limited. For example, in the case where the coating layer is formed by an off-line coating method, the coating solution applied may be subjected to heat treatment usually at a temperature of 80 to 200° C. for 3 to 40 sec and preferably at a temperature of 100 to 180° C. for 3 to 40 sec. On the other hand, in the case where the coating layer is formed by an in-line coating method, the coating solution applied may be subjected to heat treatment usually at a temperature of 70 to 280° C. for 3 to 200 sec.

In any of the off-line coating and in-line coating methods, the heat treatment may be used in combination with irradiation with active energy rays such as irradiation with ultraviolet rays, if required. The polyester film constituting the laminated polyester film according to the present invention may also be previously subjected to surface treatments such as corona treatment and plasma treatment.

The coating layer used in the present invention is suitably controlled in its refractive index in order to suppress occurrence of interference fringes, more specifically, is designed such that the refractive index of the coating layer is near a geometrical mean value of a refractive index of the polyester film as the base material and a refractive index of the surface functional layer such as a hard coat layer. The refractive index of the coating layer has a close relationship with a reflectance of the coating layer. In the present invention, the absolute reflectance of the coating layer is adjusted such that when preparing a graph by plotting a wavelength on an abscissa axis thereof and a reflectance on an ordinate axis thereof, one minimum value of the reflectance is preferably observed on a characteristic curve thereof in the wavelength range of 400 to 800 nm, and the absolute reflectance at the minimum value of the coating layer is preferably not less than 4.0%. Within the range of the absolute reflectance as defined in the present invention, if the minimum value is observed in the same wavelength range, the reflectance at the minimum value becomes a high value when the refractive index thereof is high, and becomes a low value when the refractive index thereof is low.

In the present invention, the absolute reflectance of the coating layer is controlled such that one minimum value thereof is preferably present in the wavelength range of 400 to 800 nm, and more preferably the one minimum value is present in the wavelength range of 500 to 700 nm. The reflectance value at the minimum value preferably lies within the range of 4.0 to 6.5% and more preferably 4.5 to 6.2%. In the case where the number of the minimum values being present in the wavelength range of 400 to 800 nm is not one or in the case where the absolute reflectance at the minimum value is out of the above-specified range, interference fringes tend to be caused after forming the surface functional layer such as a hard coat layer on the coating layer, so that the resulting film tends to be deteriorated in visibility.

In general, in the polyester film according to the present invention, the surface functional layer such as a hard coat layer may be provided on the coating layer. The material used in the hard coat layer is not particularly limited. Examples of the material for the hard coat layer include cured products of monofunctional (meth)acrylates, polyfunctional (meth)acrylates and reactive silicon compounds such as tetraethoxysilane. Among these materials, from the viewpoint of satisfying both a good productivity and a high hardness, especially preferred are cured products obtained by polymerizing compositions comprising ultraviolet-curable polyfunctional (meth)acrylates.

The compositions comprising the above ultraviolet-curable polyfunctional (meth)acrylates are not particularly limited. For example, there may be used a composition prepared by mixing one or more kinds of conventionally known ultraviolet-curable polyfunctional (meth)acrylates, a composition commercially available as an ultraviolet-curable hard coat material, or a composition prepared by further adding the other components to the above compositions in such a range that the effects and objects of the present invention are not adversely influenced thereby.

The ultraviolet-curable polyfunctional (meth)acrylates are not particularly limited. Examples of the ultraviolet-curable polyfunctional (meth)acrylates include (meth) acrylic derivatives of polyfunctional alcohols such as dipentaerythritol hexa(meth)acrylate, tetramethylol methane tetra(meth)acrylate, tetramethylol methane tri(meth)acrylate, trimethylol propane tri(meth)acrylate, 1,6-hexanediol di(meth)acrylate and 1,6-bis(3-acryloyloxy-2-hydroxypropyloxy)hexane; polyethylene glycol di(meth)acrylate; and polyurethane (meth)acrylate.

The other components which may be contained in the compositions comprising the ultraviolet-curable polyfunctional (meth)acrylates are not particularly limited. Examples of the other components include inorganic or organic fine particles, polymerization initiators, polymerization inhibitors, antioxidants, antistatic agents, dispersants, surfactants, light stabilizers and leveling agents. In addition, when drying the film formed by a wet coating method, an optional amount of a solvent may be added thereto, if required.

As the method of forming the hard coat layer using an organic material, there may be adopted general wet coating methods such as a roll coating method and a die coating method. The thus formed hard coat layer may be subjected to curing reaction, if required, by heating or by irradiating an active energy ray such as an ultraviolet ray and an electron beam thereto.

EXAMPLES

The present invention is described in more detail below by Examples. However, these Examples are only illustrative and not intended to limit the present invention thereto, and other modifications are also possible unless they depart from the scope of the present invention. In addition, the measuring and evaluating methods used in the present invention are as follows.

(1) Method of Measuring Intrinsic Viscosity of Polyester:

One gram of a polyester from which the other polymer components incompatible with the polyester and pigments were previously removed was accurately weighed, and mixed with and dissolved in 100 mL of a mixed solvent comprising phenol and tetrachloroethane at a weight ratio of 50:50, and a viscosity of the resulting solution was measured at 30° C.

(2) Method of Measuring Average Particle Diameter:

Using TEM ("H-7650" manufactured by Hitachi; accelerated voltage: 100 V), the coating layer was observed to measure particle diameters of 10 particles therein and calculate an average particle diameter thereof from the measured values.

(3) Method of Measuring Thickness of Coating Layer:

The surface of the coating layer was dyed with $RuO_4$, and the resulting film was embedded in an epoxy resin. Thereafter, the resin-embedded film was cut into a piece by an ultrathin sectioning method, and the cut piece was dyed with $RuO_4$ to observe and measure a cut section of the coating layer using TEM ("H-7650" manufactured by Hitachi; accelerated voltage: 100 V).

(4) Method of Evaluating Absolute Reflectance from Surface of Coating Layer Formed on Polyester Film:

A black tape ("Vinyl Tape VT-50" produced by Nichiban Co., Ltd.) was previously attached to a back surface of a polyester film which was opposite to its surface to be measured, and the surface of a coating layer formed on the polyester film was subjected to measurement for an absolute reflectance thereof in a wavelength range of 300 to 800 nm using a spectrophotometer (an ultraviolet/visible spectrophotometer "V-570" and an automatic absolute reflectance analyzer "AM-500N" both manufactured by JASCO Corp.) under the conditions of a synchronous mode; incident angle: 5°; N-polarization; response: Fast; data sampling interval: 1.0 nm; band width: 10 nm; and scanning speed: 1000 m/min, to thereby evaluate a wavelength at a minimum value of a reflectance (bottom wavelength) as well as the reflectance.

(5) Method of Evaluating Interference Fringes:

A coating solution prepared by mixing 72 parts by weight of dipentaerythritol hexaacrylate, 18 parts by weight of 1,6-hexanediol diacrylate, 10 parts by weight of antimony pentaoxide, 1 part by weight of a photopolymerization initiator ("IRGACURE 184" (tradename) produced by Ciba Speciality Chemicals Corp.) and 200 parts by weight of methyl ethyl ketone was applied on the coating layer formed on the polyester film such that a coating thickness thereof after drying was 5 μm, and cured by irradiating an ultraviolet ray thereto to thereby form a hard coat layer. The resulting film was visually observed under irradiation with light using a three band fluorescent lamp to determine whether or not any interference fringes were recognized. The observation results were evaluated according to the following ratings:

A: No interference fringes were recognized.

B: Thin and scattered interference fringes were recognized.

C: Thin but linear interference fringes were recognized.

D: Clear interference fringes were recognized.

(6) Method of Evaluating Adhesion Property:

In order to evaluate an adhesion property of the coating layer more strictly, studies have been conducted using a material obtained by excluding antimony pentaoxide from the hard coat solution used in the above evaluation (5). More specifically, a coating solution prepared by mixing 80 parts by weight of dipentaerythritol hexaacrylate, 20 parts by weight of 1,6-hexanediol diacrylate, 5 part by weight of a photopolymerization initiator ("IRGACURE 184" (tradename) produced by Ciba Speciality Chemicals Corp.) and 200 parts by weight of methyl ethyl ketone was applied on the coating layer formed on the polyester film such that a coating thickness thereof after drying was 5 μm, and cured by irradiating an ultraviolet ray thereto to thereby form a hard coat layer. The thus obtained film was allowed to stand under environmental conditions of 60° C. and 90% RH for 100 hr. Thereafter, the resulting hard coat layer was subjected to cross-cutting to form 100 (10×10) cross-cuts thereon. A 18 mm-wide tape ("Cellotape (registered trademark) CT-18" produced by Nichiban Co., Ltd.) was attached onto the thus cross-cut hard coat layer, and then rapidly peeled off therefrom at a peel angle of 180°. Then, the surface of the hard coat layer from which the tape was peeled off was observed to measure an area of the hard coat layer peeled off together with the tape. The evaluation ratings are as follows.

A: Peeled area of the hard coat layer was less than 3%.

B: Peeled area of the hard coat layer was not less than 3% but less than 10%.

C: Peeled area of the hard coat layer was not less than 10% but less than 50%.

D: Peeled area of the hard coat layer was not less than 50%.

The polyesters used in the respective Examples and Comparative Examples were prepared by the following methods.

<Method for Producing Polyester (A)>

One hundred parts by weight of dimethyl terephthalate and 60 parts by weight of ethylene glycol as starting materials were charged together with 0.09 part by weight of magnesium acetate tetrahydrate as a catalyst into a reaction vessel, and the reaction therebetween was initiated at 150° C. The reaction temperature was gradually raised while distilling off methanol as produced, and allowed to reach 230° C. after 3 hr. After 4 hr, the transesterification reaction was substantially terminated. Into the obtained reaction mixture were added 0.04 part by weight of ethyl acid phosphate and then 0.04 part by weight of antimony trioxide, followed by subjecting the resulting mixture to polycondensation reaction for 4 hr. More specifically, the reaction temperature was gradually raised from 230° C. until reaching 280° C. On the other hand, the reaction pressure was gradually reduced from normal pressure until finally reaching 0.3 mmHg. After initiation of the reaction, the change in agitation power in the reaction vessel was monitored, and the reaction was terminated at the time at which a viscosity of the reaction solution reached the value corresponding to an intrinsic viscosity of 0.63 on the basis of the change in agitation power in the reaction vessel. The resulting polymer was discharged from the reaction vessel under application of a nitrogen pressure thereto, thereby obtaining a polyester (A) having an intrinsic viscosity of 0.63.

<Method for Producing Polyester (B)>

The same procedure as in the above method for producing the polyester (A) was conducted except that after adding 0.04 part by weight of ethyl acid phosphate, 0.2 part by weight of silica particles having an average particle diameter of 1.6 μm in the form of a dispersion in ethylene glycol and 0.04 part by weight of antimony trioxide were added, and the polycondensation reaction was terminated at the time at which a viscosity of the reaction solution reached the value corresponding to an intrinsic viscosity of 0.65, thereby obtaining a polyester (B). The thus obtained polyester (B) had an intrinsic viscosity of 0.65.

The examples of the compounds constituting the coating layer are as follows.

(Examples of Compounds)

Polyester Resin Having a Naphthalene Skeleton: (IA)

Water dispersion of a polyester resin obtained by copolymerizing the following composition:

Monomer composition: (acid component) 2,6-naphthalenedicarboxylic acid/5-sodium sulfoisophthalic acid//(diol component) ethylene glycol/diethylene glycol=92/8//80/20 (mol %)

Polyester Resin Having a Naphthalene Skeleton: (IB)

Water dispersion of a polyester resin obtained by copolymerizing the following composition:

Monomer composition: (acid component) 2,6-naphthalenedicarboxylic acid/terephthalic acid/5-sodium sulfoisophthalic acid//(diol component) ethylene glycol/diethylene glycol=78/15/7//90/10 (mol %)

Metal Oxide: (IIA)

Zirconium oxide particles having an average particle diameter of 70 nm

Metal Oxide: (IIB)

Zirconium oxide particles having an average particle diameter of 15 nm

Metal Oxide: (IIC)

Titanium oxide particles having an average particle diameter of 15 nm

Isocyanate Compound: (IIIA)

In a methyl ethyl ketone solvent, 80 parts by weight of tolylene diisocyanate were added to and reacted with 100 parts by weight of a polyester polyol (average molecular weight: 1700) produced from a composition comprising adipic acid/isophthalic acid//1,6-hexanediol=50/50//100 (mol %), 9 parts by weight of 1,4-butanediol and 8 parts by weight of trimethylol propane. Thereafter, 12 parts by weight of dimethylol propionic acid, 16 parts by weight of polyethylene glycol (average molecular weight: 600) and an amine catalyst were added to the thus obtained reaction product, and the resulting mixture was reacted at 75° C. Next, 16 parts by weight of methyl ethyl ketone oxime were added to the resulting reaction product at 55° C. to produce a blocked isocyanate group-containing urethane prepolymer. Further, 7.2 parts of triethylamine and 450 parts by weight of water were mixed with the prepolymer, and further 2.9 parts by weight of triethylenetetramine were added to and reacted with the obtained mixture, and then the methyl ethyl ketone solvent was removed from the resulting reaction product to thereby obtain a blocked isocyanate compound.

Isocyanate Compound: (IIIB)

Two hundred parts by weight of a polyester (molecular weight: 2000) obtained from an adduct of bisphenol A with 2 mol of ethyleneoxide and maleic acid were mixed with 33.6 parts by weight of hexamethylene diisocyanate, and the resulting mixture was reacted at 100° C. for 2 hr. Next, the reaction system was once cooled to 50° C. at which 73 parts by weight of a 30% sodium bisulfite aqueous solution were added thereto, and the resulting mixture was stirred at 45° C. for 60 min, followed by diluting the obtained product with 718 parts by weight of water, thereby obtaining a blocked isocyanate-based compound.

Oxazoline Compound: (IIIC)

Oxazoline group- and polyalkyleneoxide chain-containing acrylic polymer "EPOCROSS WS-500" (produced by Nippon Shokubai Co., Ltd.)

Hexamethoxymethyl Melamine: (IIID)

Epoxy Compound: (IIIE)

Polyglycerol polyglycidyl ether "DECONAL EX-521" (produced by Nagase Chemtex Co., Ltd.)

Polyester Resin: (IV)

Water dispersion of a polyester resin obtained by copolymerizing the following composition:

Monomer composition: (acid component) terephthalic acid/isophthalic acid/5-sodium sulfoisophthalic acid//(diol component) ethylene glycol/1,4-butanediol/diethylene glycol=56/40/4//70/20/10 (mol %)

Particles: (VA)

Silica particles having an average particle diameter of 0.45 μm

Particles: (VB)

Silica particles having an average particle diameter of 0.30 μm

Particles: (VC)

Silica particles having an average particle diameter of 0.16 μm

Example 1

The polyester (A) was charged into an extruder, melted therein at 285° C. and then extruded therefrom on a cooling roll whose temperature was controlled to 40° C., followed by cooling and solidifying the thus extruded sheet on the cooling roll, thereby obtaining an unstretched sheet. Next, the thus obtained unstretched sheet was stretched utilizing a difference between peripheral speeds of rolls at a temperature of 85° C. and a stretch ratio of 3.4 times in a longitudinal direction thereof. Thereafter, a coating solution 1 shown in the below-mentioned Table 1 was applied on both surfaces of the thus obtained longitudinally stretched sheet. Then, the resulting coated sheet was introduced into a tenter where the sheet was stretched at a temperature of 120° C. and a stretch ratio of 4.0 times in a lateral direction thereof and then heat-treated at 225° C. Next, the obtained stretched sheet was relaxed by 2% in a lateral direction thereof, thereby obtaining a polyester film having a thickness of 125 μm which was provided on both surfaces thereof with a coating layer having a thickness (after dried) of 0.09 μm. As a result of measuring an absolute reflectance of the thus obtained polyester film, it was confirmed that the minimum value of the absolute reflectance was observed at 580 nm, and the reflectance at the minimum value was 4.8%. In addition, it was confirmed that no clear interference fringes were observed even after laminating a hard coat layer on the film, and adhesion between the respective layers in the film was good. The properties of the obtained polyester film are shown in Table 3 below.

Examples 2 to 26

The same procedure as in Example 1 was conducted except that the coating agent composition was changed to those shown in Table 1 or 2, thereby obtaining polyester films. As shown in Table 3, the thus obtained polyester films exhibited a high reflectance and a good level concerning occurrence of interference fringes and had a good adhesion property.

Example 27

A mixed raw material obtained by mixing the polyesters (A) and (B) in amounts of 90% and 10%, respectively, as a raw material for outermost layers (surface layers), and the polyester (A) as a raw material for an intermediate layer, were respectively charged into two extruders, melted therein at 285° C., and then co-extruded therefrom on a cooling roll whose surface was controlled to a temperature of 40° C. to form a sheet having a two-kind/three-layer structure (discharge amount ratio: surface layer/intermediate layer/surface layer=1:18:1), followed by cooling and solidifying the thus co-extruded sheet on the cooling roll, thereby obtaining an unstretched sheet. Next, the thus obtained unstretched sheet was stretched utilizing a difference between peripheral speeds of rolls at a temperature of 85° C. and a stretch ratio of 3.4 times in a longitudinal direction thereof. Thereafter, a coating solution 1 shown in the below-mentioned Table 1 was applied on both surfaces of the thus obtained longitudinally stretched sheet. Then, the resulting coated sheet was introduced into a tenter where the sheet was stretched at a temperature of 120° C. and a stretch ratio of 4.0 times in a lateral direction thereof and then heat-treated at 225° C. Next, the obtained stretched sheet was relaxed by 2% in a lateral direction thereof, thereby obtaining a polyester film having a thickness of 125 μm which was provided on both surfaces thereof with a coating layer having a thickness (after dried) of 0.09 μm. As a result of measuring an absolute reflectance of the thus obtained polyester film, it was confirmed that the minimum value of the absolute reflectance was observed at 580 nm, and the reflectance at the minimum value was 4.8%. In addition, it was confirmed that no clear interference fringes were observed even after laminating a hard coat layer on the film, and adhesion between the respective layers in the film was good. The properties of the obtained polyester film are shown in Table 3 below.

Example 28

The same procedure as in Example 27 was conducted except that the coating agent composition was changed to that shown in Table 2, thereby obtaining a polyester film. As shown in Table 3, the thus obtained polyester film exhibited a high reflectance and a good level concerning occurrence of interference fringes and had a good adhesion property.

Comparative Examples 1 to 8

The same procedure as in Example 1 was conducted except that the coating agent composition was changed to those shown in Table 2, thereby obtaining polyester films. The evaluation results of the thus obtained laminated polyester films are as shown in Table 3, namely, it was confirmed that clear interference fringes were observed on the respective films, or the films had a poor adhesion property between the respective layers.

TABLE 1

| Coating solutions | Coating agent composition (wt %) | | | | | | | | | | |
|---|---|---|---|---|---|---|---|---|---|---|---|
| | IA | IB | IIA | IIB | IIC | IIIA | IIIB | IIIC | IIID | IIIE | VA |
| 1 | 66.5 | 0 | 8 | 0 | 0 | 15 | 0 | 10 | 0 | 0 | 0.5 |
| 2 | 66.5 | 0 | 8 | 0 | 0 | 15 | 0 | 0 | 10 | 0 | 0.5 |
| 3 | 66.5 | 0 | 8 | 0 | 0 | 15 | 0 | 0 | 0 | 10 | 0.5 |
| 4 | 66.5 | 0 | 8 | 0 | 0 | 15 | 0 | 5 | 5 | 0 | 0.5 |
| 5 | 66.5 | 0 | 8 | 0 | 0 | 0 | 0 | 15 | 10 | 0 | 0.5 |
| 6 | 66.5 | 0 | 8 | 0 | 0 | 0 | 0 | 15 | 0 | 10 | 0.5 |
| 7 | 66.5 | 0 | 8 | 0 | 0 | 0 | 0 | 10 | 5 | 10 | 0.5 |
| 8 | 66.5 | 0 | 8 | 0 | 0 | 0 | 15 | 0 | 10 | 0 | 0.5 |
| 9 | 66.5 | 0 | 8 | 0 | 0 | 0 | 15 | 10 | 0 | 0 | 0.5 |
| 10 | 0 | 64.5 | 0 | 10 | 0 | 15 | 0 | 10 | 0 | 0 | 0.5 |
| 11 | 0 | 59.5 | 0 | 15 | 0 | 15 | 0 | 10 | 0 | 0 | 0.5 |
| 12 | 0 | 54.5 | 0 | 20 | 0 | 15 | 0 | 10 | 0 | 0 | 0.5 |
| 13 | 0 | 71.5 | 0 | 0 | 8 | 10 | 0 | 10 | 0 | 0 | 0.5 |

TABLE 2

| Coating solutions | Coating agent composition (wt %) | | | | | | | | | | | |
|---|---|---|---|---|---|---|---|---|---|---|---|---|
| | IA | IB | IIA | IIIA | IIIB | IIIC | IIID | IIIE | IV | VA | VB | VC |
| 14 | 0 | 76.5 | 8 | 10 | 0 | 5 | 0 | 0 | 0 | 0.5 | 0 | 0 |
| 15 | 0 | 81.5 | 8 | 5 | 0 | 5 | 0 | 0 | 0 | 0.5 | 0 | 0 |
| 16 | 0 | 40 | 8 | 0 | 5 | 3 | 0 | 0 | 43.5 | 0.5 | 0 | 0 |
| 17 | 0 | 61.5 | 8 | 20 | 0 | 10 | 0 | 0 | 0 | 0.5 | 0 | 0 |
| 18 | 61.5 | 0 | 8 | 0 | 20 | 10 | 0 | 0 | 0 | 0.5 | 0 | 0 |
| 19 | 30 | 0 | 8 | 15 | 0 | 5 | 0 | 0 | 41.5 | 0.5 | 0 | 0 |
| 20 | 0 | 25 | 5 | 0 | 10 | 10 | 0 | 0 | 49.5 | 0.5 | 0 | 0 |
| 21 | 66 | 0 | 8 | 15 | 0 | 10 | 0 | 0 | 0 | 1 | 0 | 0 |
| 22 | 66 | 0 | 8 | 15 | 0 | 10 | 0 | 0 | 0 | 0 | 1 | 0 |
| 23 | 65 | 0 | 8 | 15 | 0 | 10 | 0 | 0 | 0 | 0 | 0 | 2 |
| 24 | 67 | 0 | 8 | 15 | 0 | 10 | 0 | 0 | 0 | 0 | 0 | 0 |
| 25 | 0 | 0 | 5 | 0 | 10 | 10 | 0 | 0 | 74.5 | 0.5 | 0 | 0 |
| 26 | 0 | 25 | 0 | 0 | 10 | 10 | 0 | 0 | 54.5 | 0.5 | 0 | 0 |
| 27 | 0 | 91.5 | 8 | 0 | 0 | 0 | 0 | 0 | 0 | 0.5 | 0 | 0 |
| 28 | 0 | 83.5 | 8 | 0 | 0 | 0 | 8 | 0 | 0 | 0.5 | 0 | 0 |
| 29 | 0 | 66.5 | 8 | 0 | 0 | 0 | 25 | 0 | 0 | 0.5 | 0 | 0 |
| 30 | 0 | 83.5 | 8 | 0 | 0 | 0 | 0 | 8 | 0 | 0.5 | 0 | 0 |
| 31 | 0 | 83.5 | 8 | 8 | 0 | 0 | 0 | 0 | 0 | 0.5 | 0 | 0 |
| 32 | 0 | 83.5 | 8 | 0 | 0 | 8 | 0 | 0 | 0 | 0.5 | 0 | 0 |

TABLE 3

| Examples | Coating solution | Thickness (μm) | Bottom wavelength (nm) |
|---|---|---|---|
| Example 1 | 1 | 0.09 | 580 |
| Example 2 | 1 | 0.08 | 550 |
| Example 3 | 1 | 0.10 | 610 |
| Example 4 | 1 | 0.12 | 660 |
| Example 5 | 2 | 0.09 | 580 |
| Example 6 | 3 | 0.09 | 580 |
| Example 7 | 4 | 0.09 | 580 |
| Example 8 | 5 | 0.09 | 580 |
| Example 9 | 6 | 0.09 | 580 |
| Example 10 | 7 | 0.09 | 580 |
| Example 11 | 8 | 0.09 | 580 |
| Example 12 | 9 | 0.09 | 580 |
| Example 13 | 10 | 0.09 | 580 |
| Example 14 | 11 | 0.09 | 580 |
| Example 15 | 12 | 0.09 | 580 |
| Example 16 | 13 | 0.09 | 580 |
| Example 17 | 14 | 0.09 | 580 |
| Example 18 | 15 | 0.09 | 580 |
| Example 19 | 16 | 0.09 | 580 |
| Example 20 | 17 | 0.09 | 580 |
| Example 21 | 18 | 0.09 | 580 |
| Example 22 | 19 | 0.09 | 580 |
| Example 23 | 20 | 0.09 | 580 |
| Example 24 | 21 | 0.09 | 580 |
| Example 25 | 22 | 0.09 | 580 |
| Example 26 | 23 | 0.09 | 580 |
| Example 27 | 1 | 0.09 | 580 |
| Example 28 | 24 | 0.09 | 580 |

| Examples | Absolute reflectance at minimum value (%) | Interference fringes | Adhesion property |
|---|---|---|---|
| Example 1 | 4.8 | A | A |
| Example 2 | 4.9 | A | A |
| Example 3 | 4.8 | A | A |
| Example 4 | 4.8 | A | A |
| Example 5 | 5.1 | A | A |
| Example 6 | 5.1 | A | A |
| Example 7 | 5.0 | A | A |
| Example 8 | 5.0 | A | A |
| Example 9 | 5.0 | A | A |
| Example 10 | 5.1 | A | A |
| Example 11 | 5.0 | A | A |
| Example 12 | 4.7 | A | A |
| Example 13 | 4.6 | A | A |
| Example 14 | 4.8 | A | A |
| Example 15 | 5.0 | A | A |
| Example 16 | 5.1 | A | A |
| Example 17 | 4.8 | A | A |
| Example 18 | 4.9 | A | A |

TABLE 3-continued

| | | | |
|---|---|---|---|
| Example 19 | 4.6 | A | A |
| Example 20 | 4.5 | A | A |
| Example 21 | 4.5 | A | A |
| Example 22 | 4.5 | A | A |
| Example 23 | 4.1 | B | A |
| Example 24 | 4.8 | A | A |
| Example 25 | 4.8 | A | A |
| Example 26 | 4.8 | A | A |
| Example 27 | 4.8 | A | A |
| Example 28 | 4.8 | A | A |

| Comp. Examples | Coating solution | Thickness (μm) | Bottom wavelength (nm) |
|---|---|---|---|
| Comp. Example 1 | 25 | 0.09 | 580 |
| Comp. Example 2 | 26 | 0.09 | 580 |
| Comp. Example 3 | 27 | 0.09 | 580 |
| Comp. Example 4 | 28 | 0.09 | 580 |
| Comp. Example 5 | 29 | 0.09 | 580 |
| Comp. Example 6 | 30 | 0.09 | 580 |
| Comp. Example 7 | 31 | 0.09 | 580 |
| Comp. Example 8 | 32 | 0.09 | 580 |

| Comp. Examples | Absolute reflectance at minimum value (%) | Interference fringes | Adhesion property |
|---|---|---|---|
| Comp. Example 1 | 3.9 | D | A |
| Comp. Example 2 | 3.9 | D | A |
| Comp. Example 3 | 5.1 | A | D |
| Comp. Example 4 | 5.2 | A | D |
| Comp. Example 5 | 5.3 | A | D |
| Comp. Example 6 | 5.2 | A | C |
| Comp. Example 7 | 5.0 | A | B |
| Comp. Example 8 | 4.9 | A | B |

INDUSTRIAL APPLICABILITY

The film of the present invention can be suitably used, for example, in the applications of various optical films as members of liquid crystal displays or plasma displays as well as molding films in which a good adhesion property to a surface functional layer such as a hard coat layer and a good visibility are required.

The invention claimed is:

1. A laminated polyester film comprising:
a polyester film and
a coating layer which is formed on at least one surface of the polyester film and is produced by applying a coating solution comprising a polyester resin having a naphthalene skeleton, a metal oxide, and two or more kinds of crosslinking agents, thereonto, wherein
the only crosslinking agents present in the coating solution are selected from the group consisting of isocyanate compounds, oxazoline compounds, epoxy compounds, carbodiimide compounds, mixtures thereof, and reaction products thereof;
a content of the polyester resin having a naphthalene skeleton in the coating solution is 5 to 67% by weight based upon an amount of amount of non-volatile components in the coating layer;
a content of the metal oxide in the coating solution is 3 to 70% by weight based upon an amount of amount of non-volatile components in the coating layer;
a content of the two or more kinds of crosslinking agents in the coating solution is 1 to 50% by weight based upon an amount of amount of non-volatile components in the coating layer; and
the coating layer has an absolute reflectance having one minimum value in a wavelength range of 400 to 800 nm as measured on a surface thereof, and the absolute reflectance at the minimum value is not less than 4.0%.

2. A laminated polyester film according to claim 1, wherein the coating layer has a thickness of 0.04 to 0.20 μm.

3. A laminated polyester film according to claim 1, wherein the metal oxide is zirconium oxide.

4. A laminated polyester film according to claim 1, wherein the two or more kinds of crosslinking agents are selected from the group consisting of isocyanate compounds, oxazoline compounds, and mixtures of isocyanate compounds and oxazoline compounds.

5. A laminated polyester film comprising:
a polyester film and
a coating layer which is formed on at least one surface of the polyester film and is produced by applying a coating solution consisting of at least one polyester resin having a naphthalene skeleton, at least one metal oxide, two or more kinds of crosslinking agents, and at least one solvent, thereonto, wherein
the two or more kinds of crosslinking agents are selected from the group consisting of isocyanate compounds, oxazoline compounds, epoxy compounds, carbodiimide compounds, mixtures thereof, and reaction products thereof;
a content of the at least one polyester resin having a naphthalene skeleton in the coating solution is 5 to 67% by weight based upon an amount of amount of non-volatile components in the coating layer;
a content of the at least one metal oxide in the coating solution is 3 to 70% by weight based upon an amount of amount of non-volatile components in the coating layer;
a content of the two or more kinds of crosslinking agents in the coating solution is 1 to 50% by weight based upon an amount of amount of non-volatile components in the coating layer; and
the coating layer has an absolute reflectance having one minimum value in a wavelength range of 400 to 800 nm as measured on a surface thereof, and the absolute reflectance at the minimum value is not less than 4.0%.

6. A laminated polyester film according to claim 5, wherein the coating layer has a thickness of 0.04 to 0.20 μm.

7. A laminated polyester film according to claim 5, wherein the at least one metal oxide is zirconium oxide.

8. A laminated polyester film according to claim 5, wherein the two or more kinds of crosslinking agents are selected from the group consisting of isocyanate compounds, oxazoline compounds, and mixtures of isocyanate compounds and oxazoline compounds.

* * * * *